UNITED STATES PATENT OFFICE.

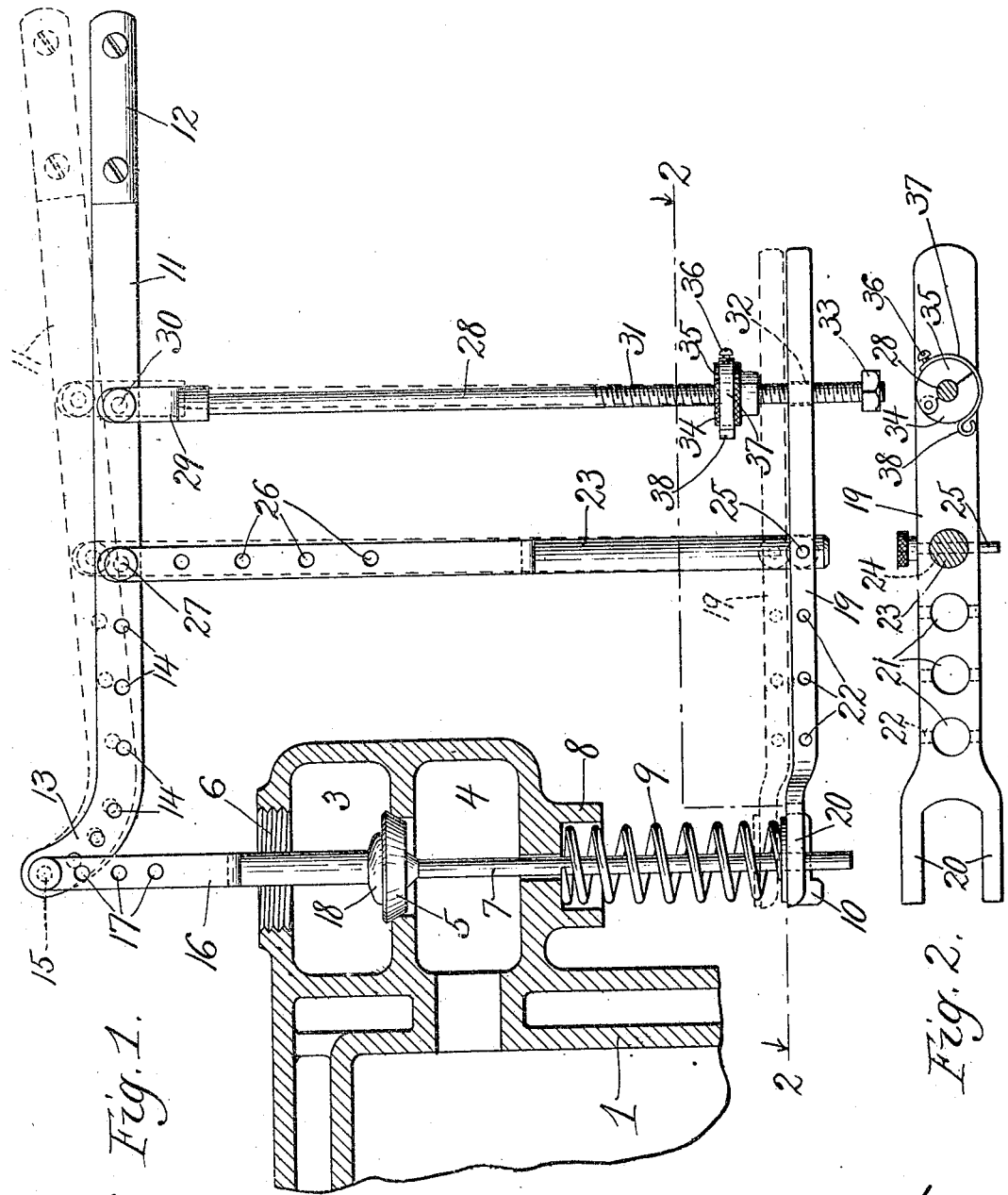

ERNEST STEVENS, OF CHICAGO, ILLINOIS.

VALVE-JACK.

No. 852,145.    Specification of Letters Patent.    Patented April 30, 1907.

Application filed March 4, 1907. Serial No. 360,403.

*To all whom it may concern:*

Be it known that I, ERNEST STEVENS, a citizen of the United States, residing at Chicago, in the county of Cook and State of Illinois, have invented a certain new and useful Improvement in Valve-Jacks, of which the following is a specification.

The object of my invention is to provide means for controlling the valve associated, for example, with a gas engine, so that the same can be removed and cleaned and ground and its seat be also cleaned and ground as may be desired, with the least possible expense.

My invention is illustrated in the accompanying drawings, wherein

Figure 1 is a sectional view from a valve casing with my device attached. Fig. 2, is a plan on the line 2—2 of Fig. 1.

Like parts are indicated by the same number in all the figures.

1 is the engine, 2 the valve casing containing the two chambers, 3, 4, and the valve 5 therein.

6 is a screw-threaded opening in the top of the chamber 3 from whence the connection has been removed.

7 is a downwardly depending stem on the valve 5. This stem passes down through a cup shaped portion 8 on the lower part of the valve case and is surrounded by the spiral spring 9 which rests at its lower end upon the pin 10. Thus the spring is kept taut and the valve 5 kept firmly in its position on its seat. When the valve and seat are to be treated the connection at 6 is removed and then my device can be applied.

My device consists of the lever arm 11 provided with a handle 12 and preferably upwardly curved at 13 and provided with a series of perforations 14 whereby it may be adjustably connected by means of the pin 15 with the stem 16 which has the perforations 17 and the disk 18 at its lower end to bear against the top of the valve.

19 is a plate provided with a bifurcated end 20 to receive the stem 7 and the lower end of the spring 9. This plate is provided with a series of holes 21 and a series of transverse holes 22. Through one of the holes 21 may be inserted the cylindrical end of the bar 23. The lower end of this bar is perforated as indicated at 24 and a pin 25 is adapted to pass through two of the holes 22 and the perforation 24 to hold the bar in proper relation to the plate. The upper end of the bar 23 is bifurcated and adapted to receive between its two parts the lever arm 11. It is perforated at 26 to permit the passage of the pin 27 which also passes through one of the holes 14 in the lever arm, thus securing the lever arm and bar together.

28 is a rod having the upper bifurcated end 29 through whose perforations passes a pin 30 which also passes through corresponding holes in the lever arm 11 to hold the arm and rod together. The lower end of the rod is screw threaded at 31 and is adapted to pass through a hole in the plate at 32 and is provided with a lower nut 33. Applied to the screw threaded portion of the rod 28 is a nut consisting of two parts 34 and 35 pivoted together and screw threaded within. On the part 35 is secured by the pin 36 a spring 37 which terminates in an eye 38. This spring passes around the two parts of the nut and holds them normally together. If forced open it permits them to separate, whereupon the nut may be moved up or down the thread without turning thereon. The parts are shown in their normal position in Fig. 2.

It will be understood that I have simply shown one form of my device. My drawing is to be taken as in a sense diagrammatic.

The use and operation of my invention are as follows: Assuming that the valve constituted as shown is to be removed or the valve or seat cleaned or ground, I proceed in the following manner: My device is put in the position indicated. The stem 16 is passed down through the opening at 6 and the plate 18 is brought against the top of the valve 5. The plate 19 is brought in position so that the bifurcated end 20 surrounds the stem 7 and bears against the lower part of the spring 9 which is held in position by the key 10. When the spring is as indicated in full lines the valve is held firmly on its seat. Since the lever arm and the plate are held together the bar 23, leaving the handle of the lever arm in the position shown in dotted lines, will raise the parts in the position shown in dotted lines, provided the outer end of the plate 19 be held down. This may be done by hand. This will compress the spring against the case and take the pressure off of the key 10. The parts may be retained in this position by running down the two part nut until it engages the top of the plate 19, whereupon the parts will be locked together. The key 10 may now be withdrawn. The device should then be loosened and the valve 5 with its stem 7, can be removed and receive such treatment as may be desired. A similar application of the device is required when the key 10 is to be replaced and the spring 9 brought into operation to force the valve against its seat.

I claim:

1. In a valve jack, the combination of a stem to rest upon the top of the valve, with a plate to engage the valve seating spring, a lever arm pivoted to the stem, and a connecting bar between the lever arm and the plate.

2. In a valve jack, the combination of a stem to rest upon the top of the valve, with a plate to engage the valve seating spring, a lever arm pivoted to the stem, a connecting bar between the lever arm and the plate, and a connecting rod with a lock nut whereby the lever arm and plate are locked in rigid relation.

3. In a valve jack, the combination of a stem to rest upon the top of the valve, with a bifurcated plate to receive the valve stem and engage the lower end of the valve seating spring, a lever arm pivoted to the stem, and a connecting bar between the lever arm and plate.

4. In a valve jack, the combination of a stem to rest upon the top of the valve, with a plate to engage the valve seating spring, a lever arm pivoted to the stem, a connecting bar between the lever arm and the plate, and a connecting rod with a lock nut whereby the lever arm and plate are locked in rigid relation; said rod being screw threaded, and said nut composed of two parts pivoted and held together by a spring.

5. In a valve jack, the combination of a lever arm and a plate approximately parallel to each other, with a stem pivoted to the lever arm and adapted to engage a fixed part, the plate adapted to engage the lower end of the valve seating spring, and a bar connecting the lever arm and plate.

ERNEST STEVENS.

Witnesses:
 JAMES T. ROSS,
 ABBIE E. JOHNSON.